United States Patent [19]

Daniels

[11] 3,933,636

[45] Jan. 20, 1976

[54] APPARATUS AND METHOD FOR DISPOSING OF SOLID HUMAN EXCREMENT IN AN ENGINE-DRIVEN CONVEYANCE

[76] Inventor: Robert A. Daniels, 520 E. 72nd St., New York, N.Y. 10021

[22] Filed: Mar. 28, 1975

[21] Appl. No.: 563,157

[52] U.S. Cl. ................. 210/71; 210/104; 210/138; 210/149; 210/152; 210/181; 4/131; 60/317
[51] Int. Cl.² ...................... B01D 21/24; F01N 3/02
[58] Field of Search ....... 210/67, 71, 104, 138, 149, 210/152, 181; 4/131; 60/317

[56] References Cited
UNITED STATES PATENTS

| | | | |
|---|---|---|---|
| 3,509,999 | 5/1970 | Reid et al. | 210/152 X |
| 3,731,490 | 5/1973 | Sargent et al. | 210/152 X |
| 3,764,010 | 10/1973 | Reid | 210/149 |
| 3,852,960 | 12/1974 | Essendabis | 210/152 X |
| 3,856,672 | 12/1974 | Boswinkle et al. | 210/152 X |

*Primary Examiner*—John Adee
*Attorney, Agent, or Firm*—Kirschstein, Kirschstein, Ottinger & Frank

[57] ABSTRACT

A waste disposal system and method which incinerates solid human excrement evacuated into a toilet bowl employing a reusable chemical flushing liquid. The liquid discharges into an individual holding tank and thereafter is reusable for additional flushes until the solid excrement in the individual holding tank reaches approximately a predetermined level which usually is determined by the number of flushes. Then the collected human waste is discharged into a main collection holding tank where the solid excrement along with some of the chemical liquid rises until a predetermined level is reached. Subsequently, and upon the simultaneous occurrence of several triggering conditions, the solid excrement and liquid present in the main collection holding tank are run through a comminutor which returns such mixture to the main tank from which it is again passed to the comminutor and back to the tank in a closed cycle, a sufficient period of time being allotted to reduce such solid excrement and the chemical liquid to a gelatinous consistency. When this consistency is reached, the same being determined by the passage of a given period of time, and if the same triggering conditions still prevail, the comminuted mixture from the closed cycle is bled off into the exhaust of the engine used to power the conveyance, the comminution being continued during such discharge.

13 Claims, 3 Drawing Figures

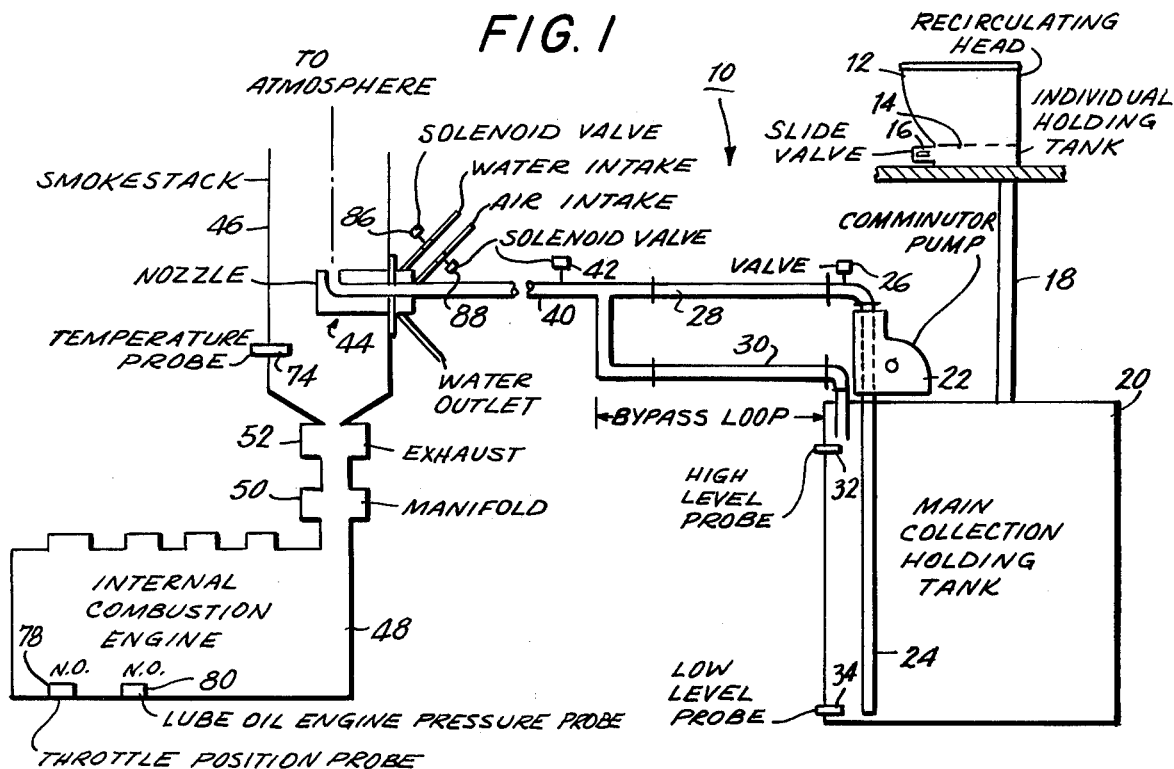
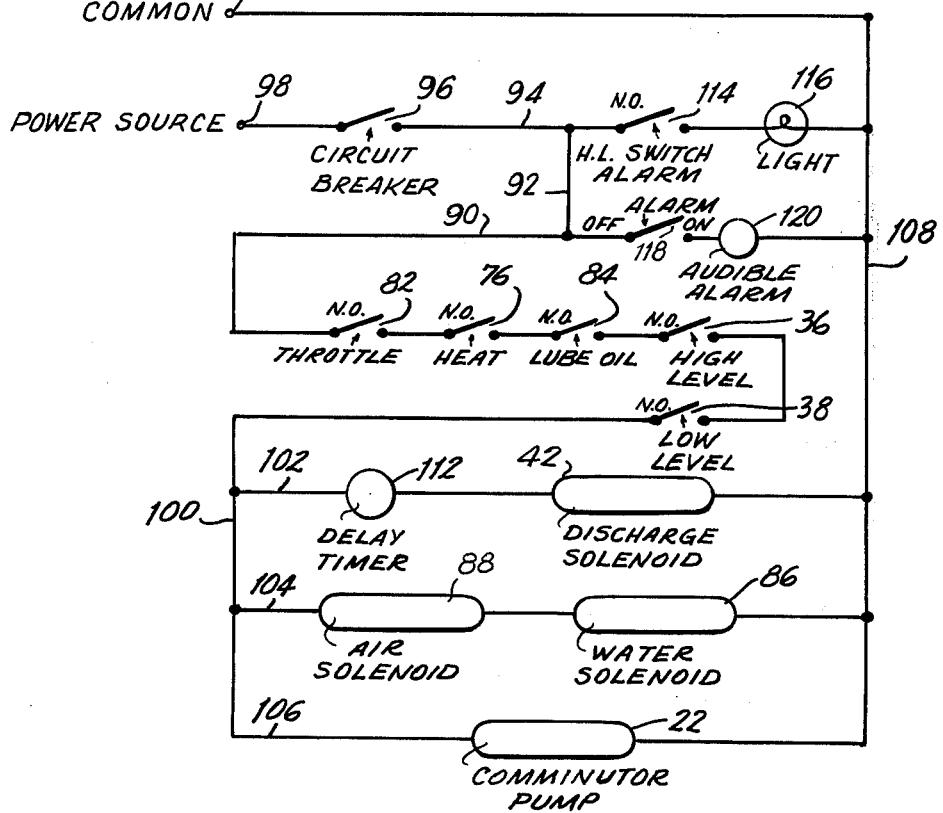

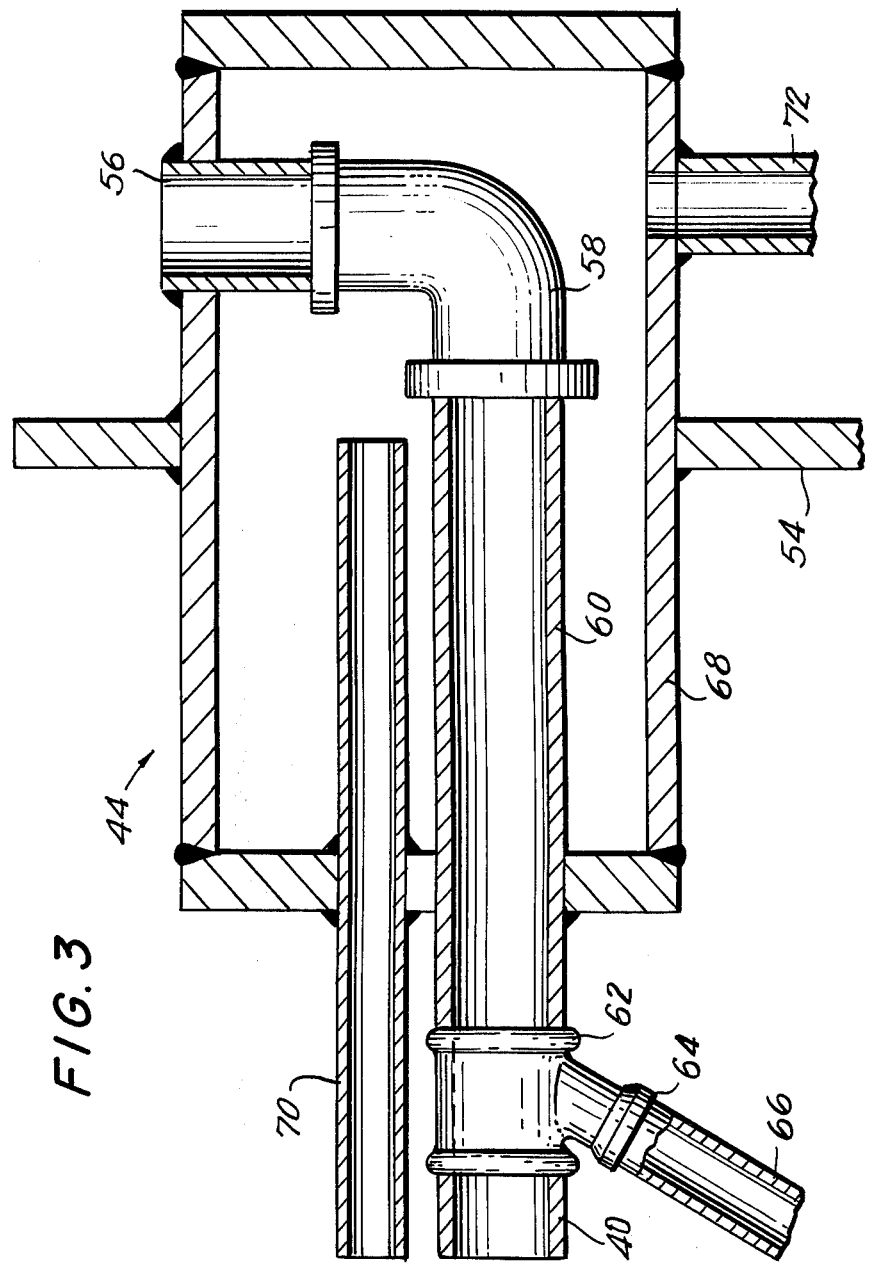

APPARATUS AND METHOD FOR DISPOSING OF SOLID HUMAN EXCREMENT IN AN ENGINE-DRIVEN CONVEYANCE

BACKGROUND OF THE INVENTION

1. Field of the Invention

Disposal of solid human excrement by incineration and combustion in the exhaust of an engine-driven conveyance.

2. Description of the Prior Art

The disposal of solid human excrement always has presented a problem which has become aggravated with the passage of years as the population grew and less room became available for accumulation and disposal equipment, and as ecologists imposed restraints on discharge of waste and the by-products of waste in the water. The problem is currently a serious one even as it relates to excrement evacuated into stationary toilets and stationary sewage systems. But when the toilet bowls are aboard a moving conveyance, the problem worsens. Where the conveyance is a land conveyance, for example, a bus, the only solution has been a holding tank, but the capacity of such a tank is inherently limited by the size of the conveyance, so that where the bus is large a substantial problem exists. Where the toilet bowl was aboard a marine craft, for years the solution seemed simple — excrement was simply discharged into the ocean, but this no longer is acceptable. Governments and states currently are exercising their superior powers to prohibit such discharge into oceans, lakes and rivers plied by marine craft and, as a result, desperate measures were resorted to. The immediate answer was to place a collection tank aboard each marine craft and to discharge the contents of the tank at the end of each trip, the discharge being into a land-based disposal unit or a sewer. However, this remedy only has proven to be temporary because of the overloading of shore-based disposal facilities, so that attention now is being turned to disposal systems which are carried by conveyances.

A large number of systems has been suggested for this purpose. However, none of these systems has proven to be commercially successful due to their inability to completely destroy the excreta, to clogging of components of the equipment, to odors discharged from the equipment and to lack of safety factors, so that there currently still is a great need for an economical, efficient, reliable system that constitutes relatively few and simple parts and can be easily installed and maintained.

SUMMARY OF THE INVENTION

1. Purposes of the Invention

It is an object of the invention to provide a waste disposal system and method which overcomes the defects attendant upon the prior art.

It is another object of the invention to provide a system and method of the character described in which the apparatus constitutes simple and relatively few parts which can be made, assembled, installed and maintained at a low cost and which, withal, is efficient and reliable.

In is another object of the invention to provide a system and method of the character described wherein the apparatus is safe and odor-free and from which the discharge into the atmosphere is wholly innocuous.

Other objects of the invention in part will be obvious and in part will be pointed out hereinafter.

2. Brief Description of the Invention

A waste disposal system and method, a principal use of which is for marine craft but which also can be used for land and air conveyances. The equipment used in the system and method includes at least one, and conventionally several, toilet bowls. The bowls are of the type which utilize a reusable chemical flushing liquid which, after each use of the bowl, is flushed and discharged to an individual holding tank, the solid human excrement being separated from the chemical flushing liquid which thereafter is used for subsequent flushes. The excrement in the individual holding tank gradually builds up until a substantial amount is accumulated, this being determined in a conventional chemical flushing toilet by the number of flushes, although, obviously, a sensor could be employed for the same purpose. When this level is reached or the requisite number of flushes has been made, the stored excrement in the individual holding tank, together with the chemical flushing liquid that has been used throughout the period, is discharged into a main collection holding tank and fresh chemical flushing liquid is charged into the system for a given bowl and associated individual holding tank. If desired, more than one bowl can use the same individual holding tank and the same charge of reusable chemical flushing liquid.

The main collection holding tank has two sensors. One is a high level sensor and the other is a low level sensor. Eventually, after a sufficient amount of solid human excrement has been amassed in the main collection holding tank, the high level sensor is actuated. This constitutes one of several triggering conditions, all of which must be present simultaneously to initiate and complete a discharge cycle from the main collection holding tank.

When the discharge cycle is initiated, the mixture of solid human excrement and chemical flushing liquid in the main collection holding tank is withdrawn by a pump from the tank and, as it is withdrawn, it is comminuted, a comminutor pump being employed for this purpose. The discharge from the comminutor pump is led back to the main collection holding tank through a by-pass loop, thereby completing a closed cycle. The continuous traversal of excrement and liquid through such closed cycle reduces the solid excrement and the chemical flushing liquid to a gelatinous consistency. When this consistency is reached, the gelatinous mixture can be bled off from the closed cycle for disposal. The point in time where the discharge can start could be determined by sensing the consistency of the gelatinous mixture. However, inasmuch as the disposal of the gelatinous mixture is not dependent upon its consistency and can efficiently be practiced in the present system and method providing that at least a given consistency is attained, the aforesaid point in time is determined as a function of time elaspsed and, to this end, a timer is employed, which is to say that the timer is started when the comminutor pump initiates its operation and after the given period of time has passed, the bleed-off from the closed cycle is actuated as by opening a valve from the by-pass loop.

The gelatinous mixture is led from the bleed-off for discharge providing that the sundry conditions which triggered the operation of the comminutor pump still prevail. In that event, the gelatinous mixture is led from the bleed-off to a discharge nozzle in the exhaust of an engine. The mixture is assisted in its discharge from the nozzle by air under pressure so that the mixture with the aid of air is reduced to a fine spray which, at the temperature of the exhaust gases from the engine, will vaporize the chemical liquid present, will dry the now-fine solid excrement, will incinerate the fine excrement and will burn any residual chemical liquid, combustible vapor from the chemical liquid and combustible solids from the excrement, the burning taking place with the assistance of the oxygen in the air that aided in the particlization of the gelatinous mixture and the excess air in the exhaust gases from the engine. The temperature of the engine exhaust gases is sufficiently high to insure that such combustion will take place. As a result, there is discharged into the atmosphere along with the exhaust from the engine the gaseous products of combustion which are, principally, water and carbon dioxide, some fine ash from the unburnable constituents of the chemical flushing liquid and solid excrement, and some fine solid hydrocarbons where the combustion has not been complete. The non-gaseous portions of the combusted gelatinous mixture are unnoticeable and harmless, as are the products of combustion of such mixture, so that their discharge into the air will not be visible, will be harmless, will be ecologically acceptable and will be odor free.

The triggering conditions aforementioned are important to the proper practice of the present invention.

The first triggering condition already has been mentioned. It is the presence of a predetermined high level of solid excrement and chemical flushing liquid in the main collection holding tank.

The second triggering condition is the temperature of the exhaust gases discharged from the engine.

The engine preferably is the engine used to drive the conveyance. Such an engine conventionally will be an internal combustion engine as, for example, a spark ignition internal combustion engine or a diesel engine. The fuel burned can be gaseous, a mixture of gasifiable combustible fluid and air, or a combustible fluid together with air. The exhaust gas temperature must be at least 600°F at the point where the gelatinous mixture is discharged into the exhaust gases along with air as droplets, e.g. a spray. Preferably, the temperature is at least somewhat higher, for instance, 625°F. It obviously would be useless to discharge the gelatinous mixture into the conduit that leads the exhaust gases to the atmosphere if the temperature in this conduit were the same as the prevailing ambient temperature because that would mean that the engine was not running. It also would not be useful to discharge the combustible mixture into the exhaust gas conduit at temperatures below 600°F because the chemical flushing liquid and the finely particulate solid excrement contained therein as a conjoint gelatinous mass would not fully incinerate and would not fully burn.

The third triggering condition is somewhat anomalous. It is that the engine be operating which, of course, is, as a first-order inference, a consequence of the second triggering condition, i.e., the temperature of the exhaust gases. However, it is not enough simply that the engine be running and that the exhaust gases be at a sufficiently high temperature because the exhaust gases may not be exiting in a sufficiently high volume to properly perform evaporation, incineration and combustion; hence, the third triggering condition is that the flow of exhaust gases be at a proper volume to suitably carry out effective evaporation, incineration and combustion.

Preferably, the third triggering condition is subdivided into two triggering conditions, each of which, in effect, backs up the other, so that if one of the sub-conditions should be fulfilled but not the other, no discharge from the bleed-off should be permitted to occur lest the emission of the excrement and flushing liquid along with the exhaust gases be offensive.

The first of the sub-conditions constituting the third triggering condition is the throttle setting for the engine. This is simply a position switch which may be located adjacent the control arm for the carburetor or the fuel throttle, or the metering valve if a fuel-injection system is employed. When the throttle is at a certain setting and the exhaust gas temperature has reached at least a certain minimum value, conditions essentially are ripe for discharge of the gelatinous mixture into the exhaust gas conduit.

However, as noted above, it is preferred also to fulfill the second sub-condition of the third triggering condition, this being the pressure of the lube oil in the engine. It is possible that the throttle may be set to a desired position but that the engine has not yet reached a performance commensurate with the throttle setting, in which event, it would be improper to discharge the gelatinous mixture into the exhaust gas conduit. However, since lube pressure is a function of engine operating conditions, the attainment of a predetermined lube pressure value will corroborate the presence of the proper operating mode of the engine. Moreover, because lube pressure might under certain conditions reach a high value but the throttle setting might be low, it is desirable to have both of these sub-conditions of the third triggering condition fulfilled before initiating operation of the comminutor pump as well as subsequently actuating the discharge of the gelatinous mixture from the bleed-off.

The operation of the comminutor pump and the discharge of the gelatinous mixture through a nozzle into the exhaust gas conduit continues once it has started until the low level sensor in the main collection holding tank is actuated. This indicates that the level of the gelatinous mixture in the main collection holding tank has reached a predetermined low value. At this time, two things occur. The comminutor pump is cut out of operation and the bleed-off from the closed cycle to the discharge nozzle stops. The system now coasts, that is to say, idles, until the high level sensor for the main collection holding tank is reactivated, whereupon the comminuting and discharge cycle is repeated as aforesaid.

It will be appreciated that people occupying the conveyance cannot be expected to understand how the present system works, nor need they. But it will be quite obvious that there will be neither comminution nor discharge if the engine is not running, or not operating under sufficient load, or not fast enough, or the exhaust gas temperature is not sufficiently high. Most of these conditions usually will be fulfilled when the conveyance is moving in a normal manner. However, if the conveyance is standing still, even when the engine is running, all the conditions may not be met, or if the engine is not running the conditions certainly will not be fulfilled. It, therefore, is possible with the aforesaid system for the level in the main collection holding tank to exceed the predetermined level at which the high level sensor is actuated without initiating a comminuting and discharge cycle. Therefore, as a further feature of the present invention, an alarm is provided which is energized when the high level sensor is actuated but the system is not set into operation. This alarm gives notice to the operators of the conveyance that they should request the passengers, at the discretion of the operators who are aware of the excess capacity of the main collection holding tank and of the number of flushes remaining before the chemical liquid and solid excrement is discharged into any given individual holding tank, to refrain from using all or some of the toilet bowls.

The invention consists in the features of construction, combination of elements, arrangement of parts and series of steps which will be exemplified in the system and method hereinafter described and of which the scope of application will be indicated in the appended claims.

BRIEF DESCRIPTION OF THE DRAWINGS

In the accompanying drawings in which is shown one of the various possible embodiments of the invention:

FIG. 1 is a schematic view of the component elements of a waste disposal system embodying the present invention;

FIG. 2 is a wiring diagram for the system; and

FIG. 3 is an enlarged sectional view through the discharge nozzle at the exhaust gas conduit.

PREFERRED EMBODIMENT OF THE INVENTION

Referring now in detail to the drawings, the reference numeral 10 denotes a waste disposal system embodying the present invention. Said system includes at least one and usually one or more batteries of chemical toilets. Each said toilet constitutes a toilet bowl 12 which employs a chemical flushing liquid. These types of chemical toilets are well known in the art. A typical such toilet bowl is the "COMMIDORE" sold by Koehler-Dayton, a division of Litton Industries, of New Britain, Connecticut. Such a toilet includes a toilet bowl 12, and a source of supply for chemical flushing liquid which conventionally is water plus a chemical additive that provides the proper combination of wetting agent, deodorizers, bacterial controls and color to the flushing liquid, all as is well known and currently available. The chemical flushing liquid is supplied from a small tank to the toilet bowl for each flushing actuation of the bowl. The liquid, after exiting from the discharge of the bowl, goes to an individual holding tank which may be at the bottom of the bowl in the position indicated by the reference numeral 14. After each flushing operation a substantial part of the solid human excrement evacuated is separated from the chemical flushing liquid most of which thereupon is returned to the container for the same, ready for reuse. Eventually, the individual holding tank approaches a predetermined capacity. This usually is determined by the number of flushes performed by the toilet bowl. By way of example and without limitation, a typical number of flushes before the individual holding tank is discharged is 160, and a typical amount of chemical flushing liquid which, as noted above, is largely water, is four gallons. A typical volume which is accumulated in the individual holding tank before discharge therefrom is 16 gallons. When this number of flushes is reached, a signal is provided by the toilet bowl, this being conventional, to inform whoever uses it next that the contents of the individual holding tank should be discharged, whereupon a slide valve 16 at the base of the toilet bowl is actuated. This causes the contents of the individual holding tank and the chemical flushing liquid that has been repeatedly reused to be dropped into a conduit 18 which leads to a main collection holding tank 20. In the unlikely event that there is only a single chemical toilet bowl 12, the conduit 18 would lead vertically from a discharge outlet of the individual holding tank 14 directly to the main collection holding tank which would be vertically beneath it. However, a more normal situation is that several toilet bowls will be provided, usually one battery in the men's room and another battery in the women's room. Each battery would feed into a header and the headers would either be directly connected or individually connected to the conduit 18 that leads to the main collection holding tank. The portion of the system thus far described is entirely conventional.

A comminutor pump 22 is provided which conveniently, although not necessarily, may be mounted on top of the main collection holding tank. The intake to the comminutor is connected by a drop pipe 24 the open bottom end of which is located near the bottom of the main collection holding tank. The discharge outlet of the comminutor pump is connected through a hand-controlled valve 26 to an effluent conduit 28. A by-pass loop 30 has its inlet tapped into the effluent conduit 28 beyond the valve 26 and its outlet located at any level, desirably a high level, within the main collection holding tank.

The main collection holding tank has two level sensors, to wit, a high level sensor 32 and a low level sensor 34. These sensors are of any suitable construction. In their simplest form they merely are floats which actuate microswitches. More sophisticated sensors may be provided such as sensors which include heating elements which are differentially responsive to the heat conductivity of ambient fluids so as to differentiate between the presence of an ambient gas or an ambient liquid. Each sensor, in effect, constitutes a probe and has in association therewith a switch, e.g. a microswitch, to wit, a switch 36 associated with the high level sensor and a switch 38 associated with the low level sensor (see FIG. 2). The switch 36, for reasons which will be apparent, is normally open, as is the switch 38. The switch 36 will close when the high level sensor is actuated upon the level of the material in the main collection holding tank reaching the sensor. The switch 38 will open when the level of the material in the main collection holding tank reaches the associated sensor 34.

A bleed-off conduit 40 is connected through a normally-closed solenoid controlled discharge valve 42 to the junction between the effluent conduit 28 and the by-pass loop 30. The sundry conditions for triggering the opening of this valve will be described in detail hereinafter, one of said conditions being closing of the normally high-level open switch 36 previously described. The discharge of the bleed-off conduit leads to a nozzle 44 physically located in a conduit 46 through which the exhaust gases from an engine 48 are discharged to the atmosphere. This conduit also sometimes is referred to in the art as a stack or smoke stack for the engine. The engine 48 is the engine which propels the conveyance in which the system 10 is located. Said conveyance can be an airplane, or a trailer, or a bus, or a boat, or a ship; its present principal contemplated use is for a marine conveyance. The engine may be of any internal combustion type as, for example, a spark ignition engine or a diesel engine. Exhaust gases which are the products of combustion leave the engine through an exhaust manifold 50, then, optionally, through a muffler 52 from which they flow into the smoke stack 46.

The nozzle 44 which is schematically indicated in FIG. 1 is shown in detail in FIG. 3. In FIG. 3 the reference numeral 54 denotes a wall of the smoke stack on which the nozzle is mounted. The reference numeral 56 denotes the discharge orifice of the nozzle, the same being connected through an elbow 58 and a short run of pipe 60 to one of the major openings of a Y-fitting 62. The other major opening of this fitting which is in axial alignment with the opening connected to the pipe 60 is connected to the bleed-off conduit 40. The angled branch 64 of the Y-fitting is connected to an air inlet conduit 66 through which air under pressure is injected. The configuration of the discharge orifice may be of simple circular shape as illustrated, or, if large amounts of the gelatinous mixture is are to be ejected therefrom and atomized with the assistance of the air from the inlet conduit 66, said orifice may be of a more complex configuration to assist in the formation of a spray, i.e., the nozzle may be of the kind normally used for reducing liquid to droplets. It will be appreciated that the discharge orifice 56, the elbow 58 and the pipe 60, since they extend through the wall 54 of the smoke stack 46, are exposed to high temperature. This temperature would have a detrimental effect on the metal of the orifice, elbow and pipe and, depending upon the type of fuel used, the amount of water vapor in the exhaust gases and the nature of the chemicals present in the exhaust gases, could quickly corrode the orifice, elbow and pipe. Moreover, the gelatinous mixture issuing from the orifice 56 might carbonize within the nozzle, due to the same high temperature, to reduce the discharge and eventually block the nozzle. Therefore, it is most desirable that the nozzle and its associated parts, to wit, the elbow and pipe, be protected against this high temperature, as they are by the presence of a jacket 68 which passes through the wall 54 to a point beyond the discharge orifice. The discharge orifice extends through an opening in the upper portion of the jacket and is welded thereto. The pipe 60 extends through an outer end wall of the jacket and is welded thereto. A cooling medium is continuously passed through the interior of the jacket and around the nozzle, elbow and pipe 60. A preferred cooling medium is water since it is inexpensive and, on marine conveyances, readily available. The water from the body of water in which the conveyance is traveling can be used, in which case, if the water is salt water the interior of the jacket and the exteriors of the elements contained within the jacket preferably are treated against corrosion as by galvanizing. The cooling medium is introduced into the jacket through an intake pipe 70 and leaves the jacket through an outlet pipe 72.

One of the triggering controls, to wit, the high level normally-open switch 36, already has been mentioned. The other triggering controls are three in number, two of them being sub-controls which reinforce each other. More specifically, the second triggering control is a heat control. It constitutes a temperature sensing probe 74 located in the smoke stack 46 close to the nozzle 44. The function of this probe, as has been mentioned previously, is to insure that there is no discharge of the gelatinous mixture from the nozzle 44 when the exhaust gas temperature (among other conditions) is not at least 600°F and preferably at least 625°F. Temperature sensing probes are so wide in their variety and structure and so well known in the art that no sensing probe is here illustrated. By way of example, however, the same may constitute a contact mounted on a bimetallic strip which contact is normally spaced from a stationary contact and which is moved toward the stationary contact by flexing of the strip caused by a rising of its temperature. The switch associated with the stack temperature probe 64 is indicated by the reference numeral 76 in the circuit diagram of FIG. 2.

The next two triggering controls of both employed to indicate running of the engine 48 under a high enough load and at a high enough speed to obtain a sufficient volume of exhaust gas flow through the smoke stack past the nozzle 44. These triggering controls are sub-controls, one of which is a throttle position probe 78 and the other a lube oil engine pressure probe 80. The throttle position probe simply constitutes a sensing finger in the path of travel of an element in the kinematic linkage between the throttle and the fuel regulator, e.g. a carburetor fuel control arm or a control arm for a fuel injection pump. A switch 82 which is normally open is regulated by the throttle position probe and is closed when the throttle has been sufficiently far advanced. The lube oil pressure probe constitutes a pressure switch 84 connected in the lubricating oil circuit. The switch is normally open and is closed when the lubricating oil pressure reaches at least a predetermined level. The combination of the throttle probe and the lube oil pressure probe insures that when both have been actuated, i.e. their switches closed, the volume of exhaust gases is sufficient to incinerate the gelatinous mixture and, with the aid of the excess air in the exhaust gases and the air entrained in the combustible mixture and supplied through the air inlet conduit 66, so much of the mixture as is combustible will be burned.

The system further includes a solenoid controlled valve 86 in the water intake pipe 70 and a solenoid controlled valve 88 in the water outlet pipe 72.

Additional components form part of the system 10 but reference thereto will be included in the following description of the operation of the system which will be made in connection with FIG. 2, the electric circuit for the system, inasmuch as the additional components basically are electrical in character.

The electrical system of FIG. 2 is shown in its ideal position, this being the state of the sundry components at a time before the level of the material within the main collection holding tank has reached the high level probe 32. This material constitutes, at such time, to a major extent, a non-gelatinous mixture of solid human excrement and chemical flushing liquid and other waste matter. The balance of the material in the tank at this time is in the form of the remainder of the gelatinous mixture which previously had been created during the last comminuting and discharge cycle and was left at the end of the cycle upon opening of the switch 38.

When the previous comminuting and discharge cycle terminated and the main collection holding tank are substantially empty, the toilet bowls 12 will, in the course of events, be used from time to time and, at the end of a proper number of flushes, will have the individual holding tank associated therewith discharged into the main collection holding tank by operation of the slide valve 16, this occurring from time to time for all of the toilet bowls the discharge from the individual holding tanks of which are connected to the main collection holding tank. Thus, the level of the material continues to rise with the passage of time until, eventually, said level reaches the high level probe 32, whereupon the normally-open switch 36 is closed. This is a triggering condition to commence operation of the comminutor pump. However, the pump must not be started if the engine is shut down because the gelatinous mixture would be neither incinerated nor combusted. Nor should the pump be started if the engine is idling or running at a low speed or under a light load because then the flow of exhaust gases would not be sufficiently great to properly combust the gelatinous mixture. Nor should the comminution start if the temperature in the stack is not sufficiently high for incineration and combustion.

Therefore, the normally open stack temperature switch 76, the normally open throttle position switch 82 and the normally open lube oil pressure switch 84 are electrically connected in series as is seen in FIG. 2. This series-connected group of switches also is connected in series with the normally open low level main collection holding tank switch 38, i.e., the switches 36, 76, 82 and 84. The switch 38, of course, will have been closed prior to the switch 36, its closing having taken place shortly after a major fraction of the material in the main collection holding tank has been discharged. This group of five switches is connected through lead lines 90, 92 and 94 to a circuitbreaker 96 that, in turn, is connected to the hot side of a source of power 98. The terminal of the switch 38, other than the terminal connected to the switch 36, is connected to a power bus 100.

Three load branches 102, 104 and 106 are taken off the power bus. Each of these branches runs to a return bus 108 that is connected to the common terminal 110 of the power source.

The branch 106 includes in it only the comminutor pump 22. As a result, when the three control conditions are triggered (one of them constituting the two subconditions), to wit, a high level is reached in the main collection holding tank, the temperature of the exhaust gases in the smoke stack is at least 600°F and preferably at least 625°F, and the engine 48 is running at at least a certain throttle setting and having at least a minimum pressure in the lubricating oil, the comminutor pump is actuated. At this moment the solenoid valve 42 still is idle, for a reason which shortly will be pointed out, so that the material in the tank 20 is drawn up through the drop pipe 24 into the comminutor pump where it is macerated and delivered under a pressure head to the effluent conduit 28 and then back through the by-pass loop 30 into the holding tank. This pumping and macerating action must take place for at least a certain minimum of time, e.g. 2 minutes, for any specific size of main collection holding tank. The specific time mentioned, i.e., 2 minutes, is a satisfactory time for a 55-gallon holding tank which is a suitable size for a small boat such,, for instance, as a tug having three recirculating toilet bowls (toilet bowls with a recirculating flushing liquid). Proportionally longer periods of comminution time without discharge are utilized for proportionately larger main collection holding tanks, and vice versa.

By the end of this period of time, the solid human excrement and other waste material will have been finely ground and uniformly dispersed throughout the chemical flushing liquid so that the mixture assumes a gelatinous consistency which can be roughly compared to the consistency of apple sauce. It should further be mentioned that the specific period of time mentioned is not to be considered as critical. However, the time should be long enough to at least create the aforesaid consistency so that throughout the mixture, as it is being circulated from the main collection holding tank through the comminutor back to said tank, there will be essentially no visible noticeable solid masses, all of the same having been reduced to the mentioned fine size in which they are suspended in the liquid. The gelatinous mixture now is ready for discharge through the nozzle 44 into the smoke stack 46 in atomized form for incineration and combustion.

In order to make certain that the comminutor pump runs without discharge for a suitable time to attain the desired consistency, a delay timer 112 is interposed in the branch 102 between the power bus 100 and the return bus 108, said timer being in series with the solenoid controlled discharge valve 42. Hence, when the predetermined period of time has elapsed, the solenoid of the discharge valve 42 will be actuated to open this normally closed valve. However, this solenoid will not be energized unless the four triggering conditions still prevail, which is to say, the switches 36, 76, 82 and 84 must be closed (the switch 38 obviously still is closed because there is considerable material in the main collection holding tank. If any one of these triggering conditions is absent, the valve 42 will remain closed. Thus, if the engine shuts down or if the temperature in the stack drops or if the engine is idling after the comminutor has been turned on, the valve 42 will not open despite the fact that the proper period of time has elapsed. It further will be observed that if any one of these triggering conditions ceases to prevail, the comminutor pump will be shut down, so that burn-out of the pump is prevented. It additionally should be pointed out that the pump cannot continue to operate after the material in the main collection holding tank has fallen below the low level probe because at such time the switch 38 will assume its normally-open position.

The third branch, i.e., the branch 104, contains in it the water solenoid 86 and the air solenoid 88, although, if desired, this branch may derive its power from a point after the delay timer rather than directly from the power bus 100. When the air and water solenoids are actuated, water will start to circulate through the jacket 68 of the nozzle 44 and air will be supplied through the air inlet conduit to the pipe 60, elbow 58 and discharge orifice 56.

When the solenoid 42 is actuated, the gelatinous mixture from the main collection holding tank will be bled-off through this valve and through the conduit 40 leading to the nozzle 44. In a typical installation, for example the one which was discussed above with the 55-gallon main holding tank, a suitable rate of discharge of the gelatinous mixture is from about one-half to one gallon per minute which leaves through the discharge orifice 56. For the indicated rate of discharge, the size of the orifice is ¾ inch. The air in the same typical installation is injected into the pipe 60 at a pressure of about 10 psig. The air is injected at a rate of about 1 cfm while the gelatinous mixture is discharged through the orifice at a rate of about 1 gallon per minute, at 5 psig, so that the approximate ratio between the volume of air and the volume of combustible mixture at the zone of discharge is about eight to one. It is iterated that all of the foregoing figures simply are exemplificative and not intended to be restrictive, nor are they critical. The ratio between the rate of discharge of the air and of the gelatinous mixture and the relative pressures of the two are so selected for the given nozzle that the gelatinous mixture assumes an atomized state as it leaves the nozzle. With the figures mentioned, the atomized mixture has the appearance of a heavy mist. The gelatinous particles are tiny — of sub-droplet size — so that the particles jointly present a large surface area whereby the liquid phase of the particles will quickly vaporize at the elevated temperature to which they are exposed (at least 600°F), so much of the vapors as are combustible will combust, so much of the solid phase as is noncombustible will incinerate, and so much of the solid phase as is combustible will burn either directly or be decomposed into combustible components which are burned.

The discharge of the atomized air-enveloped gelatinous mixture continues, as does the closed comminution cycle, until the level of the material in the main collection holding tank reaches the low level probe. At this time the switch 38 opens to shut off the comminutor pump, thereby to deactivate the comminutor pump 22, the discharge solenoid 42, the water solenoid 86 and the air solenoid 88, whereupon the system returns to its quiescent condition to await the next activation thereof upon closure of the high level switch 36 when the triggering conditions concurrently prevail.

As a safety factor, the high level probe also includes a normally open switch 114 in series with a signal device such as a light 116 between the circuitbreaker 96 and the return bus 108. The switch 114 is set to close after the switch 36, that is to say, when the level of the material in the main collection holding tank is at a slightly higher elevation than the level at which the switch 36 closes. The purpose of the switch 114 and the signal device 116 are to advise the operating personnel that the comminutor pump has not been energized and the discharge cycle will not be started because one or more of the triggering conditions does not prevail, in which event, it is desirable for the operator to notify people aboard the conveyance not to use, or at least not to flush, the toilet bowls until further notice or the material in the main collection holding tank will back up into the bowls. The operating personnel can make such notification by closing a manually actuatable alarm switch 118 to energize another signal device 120, e.g. an audible alarm.

It thus will be seen that this are provided a system and method which achieve the various objects of the invention and which are well adapted to meet the conditions of practical use.

As various possible embodiments might be made of the above invention, and as various changes might be made in the embodiments above set forth, it is to be understood that all matter herein described or shown in the accompanying drawings is to be interpreted as illustrative and not in a limiting sense.

Having thus described the invention there is claimed as new and desired to be secured by Letters Patent:

1. On a conveyance, a disposal system for sewage including solid waste and liquid, said system comprising:
 a. a recirculation toilet bowl employing a reusable chemical flushing liquid and having an individual holding tank in which solid waste is substantially separated from liquid and said waste and liquid are accumulated, said bowl having means for discharging said individual holding tank after several flushes,
 b. a main collection holding tank,
 c. means for leading the discharge from the individual holding tank to the main collection holding tank,
 d. a comminutor pump, said pump having
   i. an outlet and
   ii. an inlet,
 e. means connecting the inlet to adjacent the bottom of the main collection holding tank,
 f. means connecting the outlet to the main collection holding tank so that when the pump is in operation a closed cycle is provided for withdrawing liquid and solid waste from the main collection holding tank, macerating it in the pump and returning it to the main collection holding tank whereby after a length of time the material in the main collection holding tank will assume a geltinous consistency,
 g. an internal combustion engine furnishing a source of power for propelling the conveyance, said engine having an exhaust through which exhaust gases from the engine are discharged,
 h. an exhaust-gas conduit to receive exhaust gases discharged from the engine and to eject them into the atmosphere,
 j. a nozzle in the exhaust gas conduit,
 k. a bleed-off conduit leading from the comminutor discharge to the nozzle,
 m. a valve in said conduit,
 n. means for energizing said pump while said valve is closed so as to convert the liquid and waste in the main collection holding tank to a gelatinous consistency,
 o. means for opening the valve after said material is reduced to a gelatinous consistency and for discharging said material through the bleed-off conduit and out of the nozzle,
 p. means for injecting air under pressure into the material leaving the nozzle so as to atomize the same,
 q. said pump-actuating means being under the regulation of the following triggering conditions:
   i. the temperature of exhaust gases in the exhaust gas conduit,
   ii. the level of material in the main collection holding tank, and
   iii. the condition of the engine
   iv. such that the comminutor pump is not actuated unless the temperature of the exhaust gases in the stack is at least 600°F, the level of the material in the main collection holding tank is at least at a predetermined high elevation, and the engine is running, is not idling and is operating under conditions sufficient to engender a volume of exhaust gases that will substantially fully evaporate, incinerate and combust the vaporized gelatinous material in the smoke stack with the aid of the injected air,
 r. said valve in the bleed-off conduit being closed during operation of the comminutor pump, and
 s. time delay means for opening the valve after a period of time sufficient to reduce the material in the main collection holding tank to a gelatinous consistency while the said triggering conditions still prevail.

2. A system as set forth in claim 1 wherein the temperature of the exhaust gases in the exhaust gas conduit, which is one of the triggering conditions, is at least 625°F.

3. A system as set forth in claim 1 wherein cooling means is provided for the nozzle.

4. A system as set forth in claim 3 wherein the cooling means is a water jacket.

5. A system as set forth in claim 1 wherein the valve in the bleed-off conduit and the means for injecting air into the nozzle are rendered operable when the triggering conditions prevail.

6. A system as set forth in claim 4 wherein means is provided to supply water to the jacket and wherein a valve is interposed between said water supply means and said jacket, said valve being actuated when the triggering conditions prevail.

7. A system as set forth in claim 1 wherein the engine condition, which is one of the triggering conditions, is responsive to the position of the throttle for the engine and to the lube oil pressure for the engine.

8. A system as set forth in claim 1 wherein a low level sensor for the material in the main collection holding tank is provided, said sensor rendering the pump actuating means ineffective when the level of the material in the main collection holding tank is below a predetermined low elevation.

9. A system as set forth in claim 7 wherein a different probe is provided for each different triggering condition.

10. A system as set forth in claim 9 wherein each probe, when actuated, closes a normally-open switch, the energizing circuit for the pump actuating means being in series with all said switches, the energizing circuit for the bleed-off conduit valve means being in series with all said switches and a time delay means, and the energizing circuit for the air injection means being in series with all said switches.

11. A method for disposing of sewage on a conveyance which sewage includes solid waste and liquid from a main collection holding tank to which liquid and solid waste are discharged from a recirculation toilet bowl employing a reusable chemical flushing liquid and having an individual holding tank in which solid waste substantially is separated from said liquid and accumulated and thereafter said waste and liquid are discharged into the main collection holding tank after several flushes of the toilet bowl, said method comprising:

a. actuating a comminutor pump to withdraw material from the main collection holding tank and return it to said tank for a sufficient length of time for the material in the tank to assume a gelatinous consistency, b. after the material in the main collection holding tank has assumed such a consistency, discharging said material in atomized form with the aid of air under pressure into an exhaust gas conduit for an engine, c. said material thus atomized being bled-off from the material leaving the comminutor, d. said comminutor being operated upon the occurrence of the following triggering conditions:
  i. the temperature of the exhaust gases in the exhaust gas conduit,
  ii. the high level of material in the main collection holding tank, and
  iii. the condition of the engine
  iv. such that the comminutor pump is not actuated unless the temperature of the exhaust gases in the stack is at least 600°F, the level of the material in the main collection holding tank is at least at a predetermined high elevation, and the engine is running, is not idling and is operating under conditions sufficient to engender a volume of exhaust gases that will substantially fully evaporate, incinerate and combust the vaporized gelatinous material in the smoke stack with the aid of the injected air, e. said discharge being actuated upon the occurrence of the same triggering conditions and after a time delay sufficient to reduce the material to said gelatinous consistency.

12. A method as set forth in claim 11 wherein the temperature of the exhaust gases is at least 625°F.

13. A method as set forth in claim 11 wherein the engine condition is determined by throttle setting and lube oil pressure.

* * * * *